(12) United States Patent
Uehara

(10) Patent No.: US 8,641,537 B2
(45) Date of Patent: Feb. 4, 2014

(54) DAMPER MECHANISM

(75) Inventor: Hiroshi Uehara, Hirakata (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 13/641,593

(22) PCT Filed: Apr. 15, 2011

(86) PCT No.: PCT/JP2011/059415
§ 371 (c)(1),
(2), (4) Date: Oct. 16, 2012

(87) PCT Pub. No.: WO2011/138894
PCT Pub. Date: Nov. 10, 2011

(65) Prior Publication Data
US 2013/0035170 A1    Feb. 7, 2013

(30) Foreign Application Priority Data
May 7, 2010   (JP) ................................ 2010-107208

(51) Int. Cl.
*F16F 15/121*   (2006.01)
(52) U.S. Cl.
USPC ..................................... 464/68.92
(58) Field of Classification Search
USPC ......... 464/62.1, 64.1, 66.1, 68.1, 68.4, 68.41, 464/68.9, 68.92
See application file for complete search history.

(56) References Cited

U.S. PATENT DOCUMENTS

| | | | |
|---|---|---|---|
| 1,893,486 A * | 1/1933 | Black | 464/66.1 |
| 5,163,875 A | 11/1992 | Takeuchi | |
| 5,257,687 A * | 11/1993 | Cooke | 464/68.4 X |
| 5,582,076 A | 12/1996 | Hamada et al. | |
| 5,617,940 A | 4/1997 | Fukushima et al. | |
| 6,050,383 A | 4/2000 | Hashimoto et al. | |
| 8,376,864 B2 * | 2/2013 | Yamamoto et al. | 464/68.1 |

FOREIGN PATENT DOCUMENTS

| | | |
|---|---|---|
| JP | H2-143541 U | 12/1990 |
| JP | H7-35845 U | 7/1995 |
| JP | H07-208547 A | 8/1995 |
| JP | H7-224899 A | 8/1995 |
| JP | H09-242825 A | 9/1997 |
| JP | H10-26184 A | 1/1998 |
| JP | H10-238589 A | 9/1998 |
| JP | H11-173382 A | 6/1999 |
| JP | 2001-304341 A | 10/2001 |
| JP | 2003-336690 A | 11/2003 |

* cited by examiner

*Primary Examiner* — Gregory Binda
(74) *Attorney, Agent, or Firm* — Global IP Counselors, LLP

(57) ABSTRACT

A damper mechanism includes a first flywheel, an output plate, a first spring assembly and a second spring assembly. The first spring assembly is disposed between a first support part and a transmission part in a preliminarily compressed state. The second spring assembly is disposed between a second support part and the transmission part in a preliminarily compressed state. The stopper part is disposed for making contact with the first spring assembly and the second spring assembly in the rotational direction. Gaps are reliably produced in the rotational direction between the stopper part and both of the first spring assembly and the second spring assembly in a neutral state of applying no external force to the first flywheel and the output plate.

9 Claims, 14 Drawing Sheets

DAMPER MECHANISM

CROSS-REFERENCE TO THE RELATED APPLICATION

This U.S. national phase application claims priority to Japanese Patent Application No. 2010-107208 filed May 7, 2010. The entire disclosure of Japanese Patent Application No. 2010-107208 is hereby incorporated herein by reference

TECHNICAL FIELD

The present invention relates to a damper mechanism for attenuating rotational vibration.

BACKGROUND ART

A drive train for a vehicle is embedded with a variety of devices for transmitting power generated in an engine. For example, a clutch device and a flywheel assembly are assumed as such type of devices. In these devices, a damper mechanism is used for attenuating rotational vibration (see e.g., Patent Literatures 1 and 2).

CITATION LIST

Patent Literature

PTL 1: Japan Laid-open Patent Application Publication No. JP-A-H07-208547
PTL 2: Japan Laid-open Patent Application Publication No. H09-242825

SUMMARY

This type of damper mechanism includes elastic members such as springs. Rotational vibration is absorbed or attenuated by the elastic members.

However, the elastic members are repeatedly extended and contracted on the positive side and the negative side of torsional characteristics while the damper mechanism is actuated. Therefore, frequency of extension and contraction of the elastic members is increased and durability of the damper mechanism can be thereby degraded.

In view of the above, a damper mechanism is proposed that includes elastic members configured to be actuated only on the positive side of torsional characteristics and elastic members configured to be actuated only on the negative side of torsional characteristics.

However, a drive plate for driving the elastic members collides against the ends of the elastic members when a state of the damper mechanism is shifted from the positive side to the negative side of torsional characteristics or vice versa. Accordingly, noise vibration performance is thereby degraded.

It is an object of the present invention to simultaneously enhance durability and noise vibration performance of a damper mechanism.

A damper mechanism according to the present invention includes a first rotor, a second rotor, a first elastic member, and a second elastic member. The first rotor includes a first support part, a second support part, and a stopper part disposed between the first support part and the second support part in a rotational direction. The second rotor includes a transmission part disposed between the first support part and the second support part in the rotational direction. The second rotor is rotatably disposed with respect to the first rotor. The first elastic member is disposed between the first support part and the transmission part in a preliminarily compressed state. The second elastic member is disposed between the second support part and the transmission part in a preliminarily compressed state. The stopper part is disposed for making contact with the first elastic member and the second elastic member in the rotational direction. A gap is reliably produced between the stopper part and at least either of the first elastic member and the second elastic member in a neutral state of applying no external force to the first rotor and the second rotor.

Each of the first and second elastic members can be herein a single member that can generate elastic force, or alternatively, a combination of a plurality of members that can generate elastic force. For example, the first elastic member can be a single spring, or alternatively, an assembly of a plurality of springs. Further, the first elastic member can conceptually include not only a spring but also a seat member attached to an end of the spring. Similarly to the first elastic member, this is also true of the second elastic member.

In the damper mechanism, the first elastic member is compressed between the first support part and the stopper part when the first rotor is rotated with respect to the second rotor. On the other hand, the second elastic member is compressed between the second support part and the stopper part when the first rotor is reversely rotated with respect to the second rotor. Thus, the first elastic member is compressed on one side of torsional characteristics, while the second elastic member is compressed on the other side of torsional characteristics. Therefore, it is possible to reduce frequency of actuating the first elastic member and the second elastic member.

Further, a gap is reliably produced between the stopper part and at least either of the first elastic member and the second elastic member in the neutral state of applying no external force to the first rotor and the second rotor. Therefore, the transmission part is interposed between the first elastic member and the second elastic member within a range of the gap. As a result, it is possible to keep a state that the transmission part makes contact with at least either of the first elastic member and the second elastic member at around a torsion angle of 0 degrees. It is thereby possible to enhance noise vibration performance.

Accordingly, the present damper mechanism can simultaneously enhance durability and noise vibration performance thereof.

DETAILED DESCRIPTION OF THE PREFERRED EMBODIMENTS

<Entire Structure>

Figure 1:
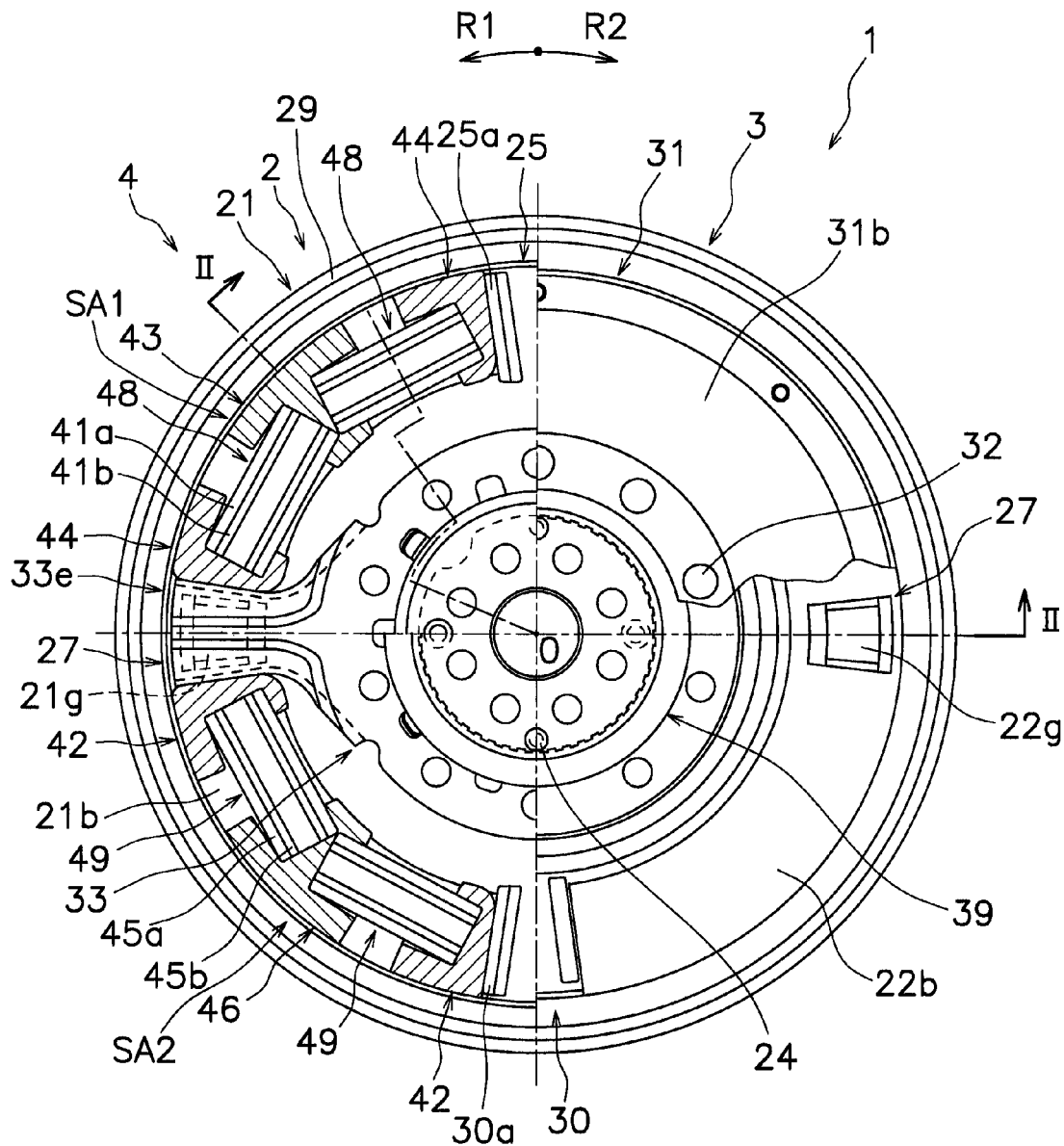
FIG. 1 is a plan view of a flywheel assembly.
Figure 2:
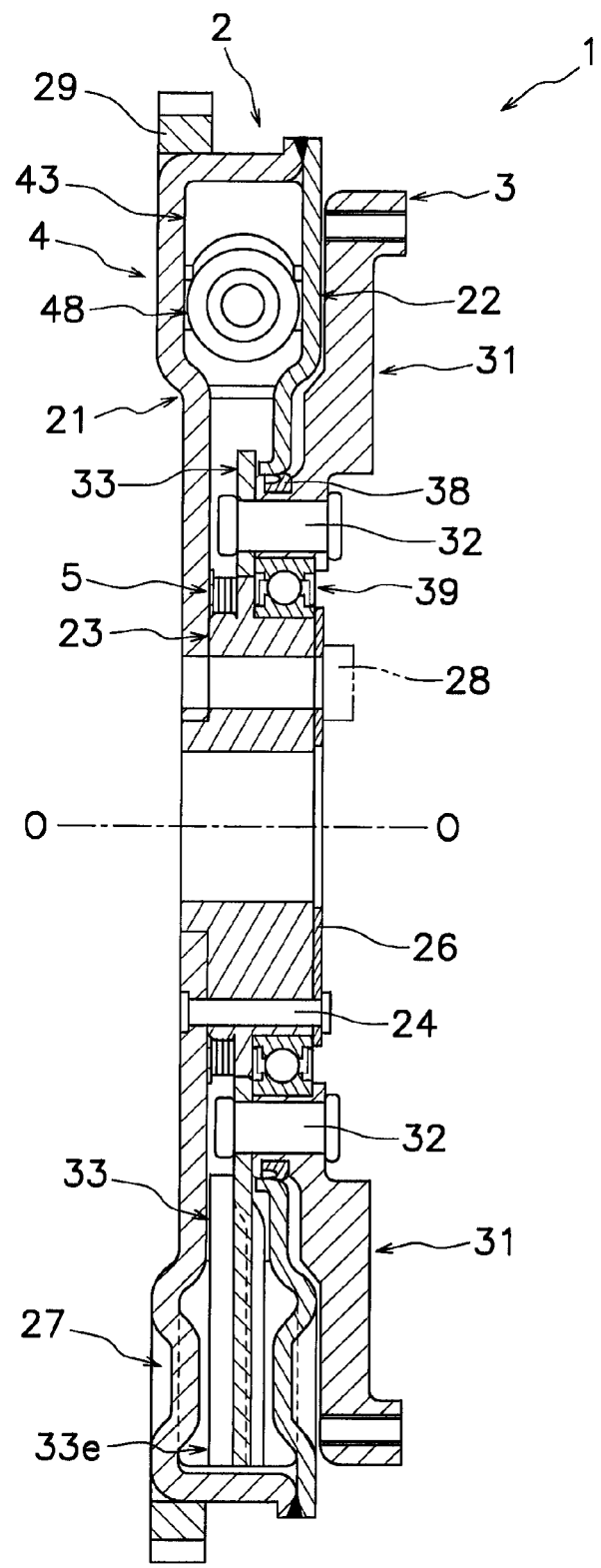
FIG. 2 is a cross-sectional view of FIG. 1 sectioned along a line II-II.
Figure 3:
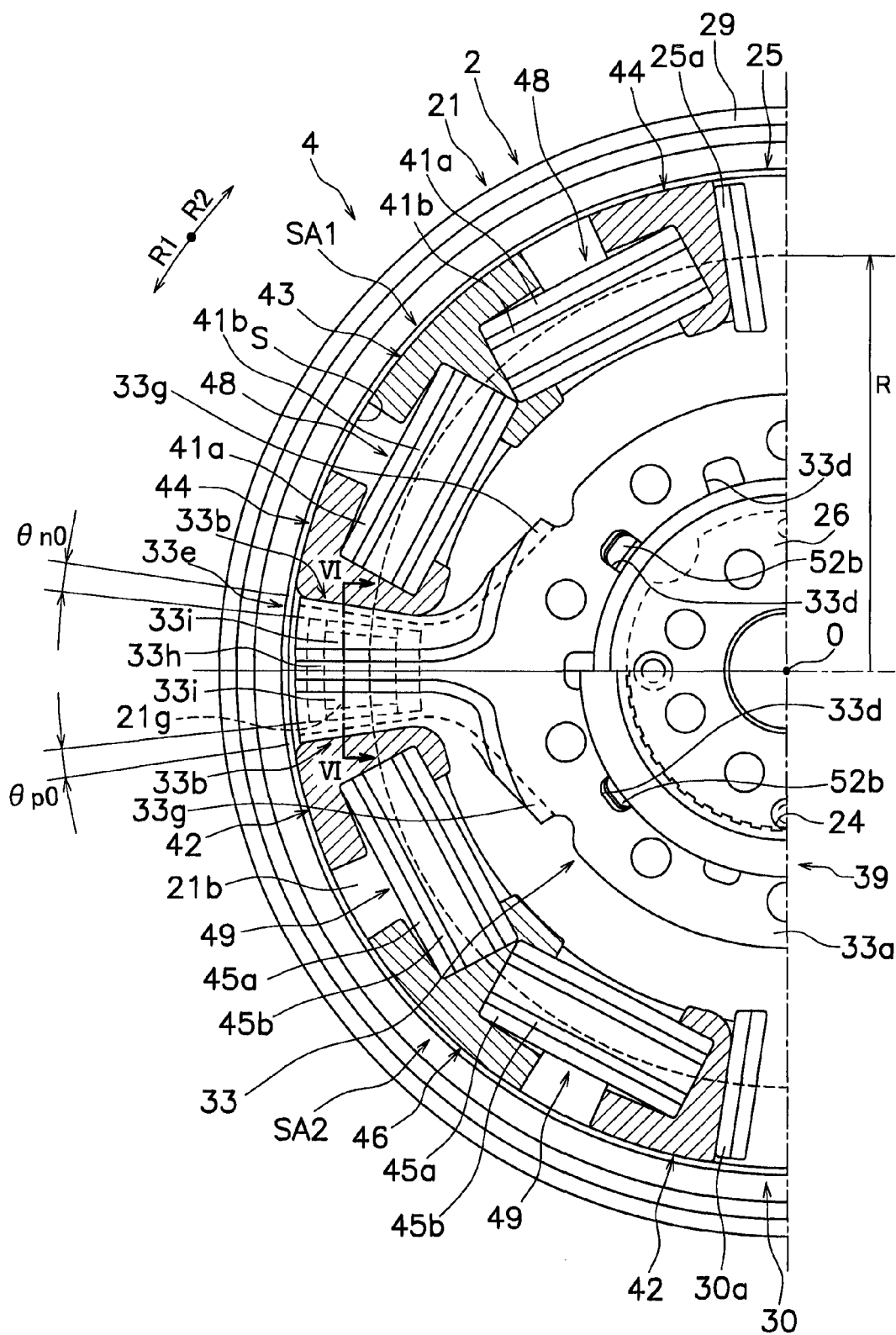
FIG. 3 is a partial plan view of the flywheel assembly.
Figure 4:
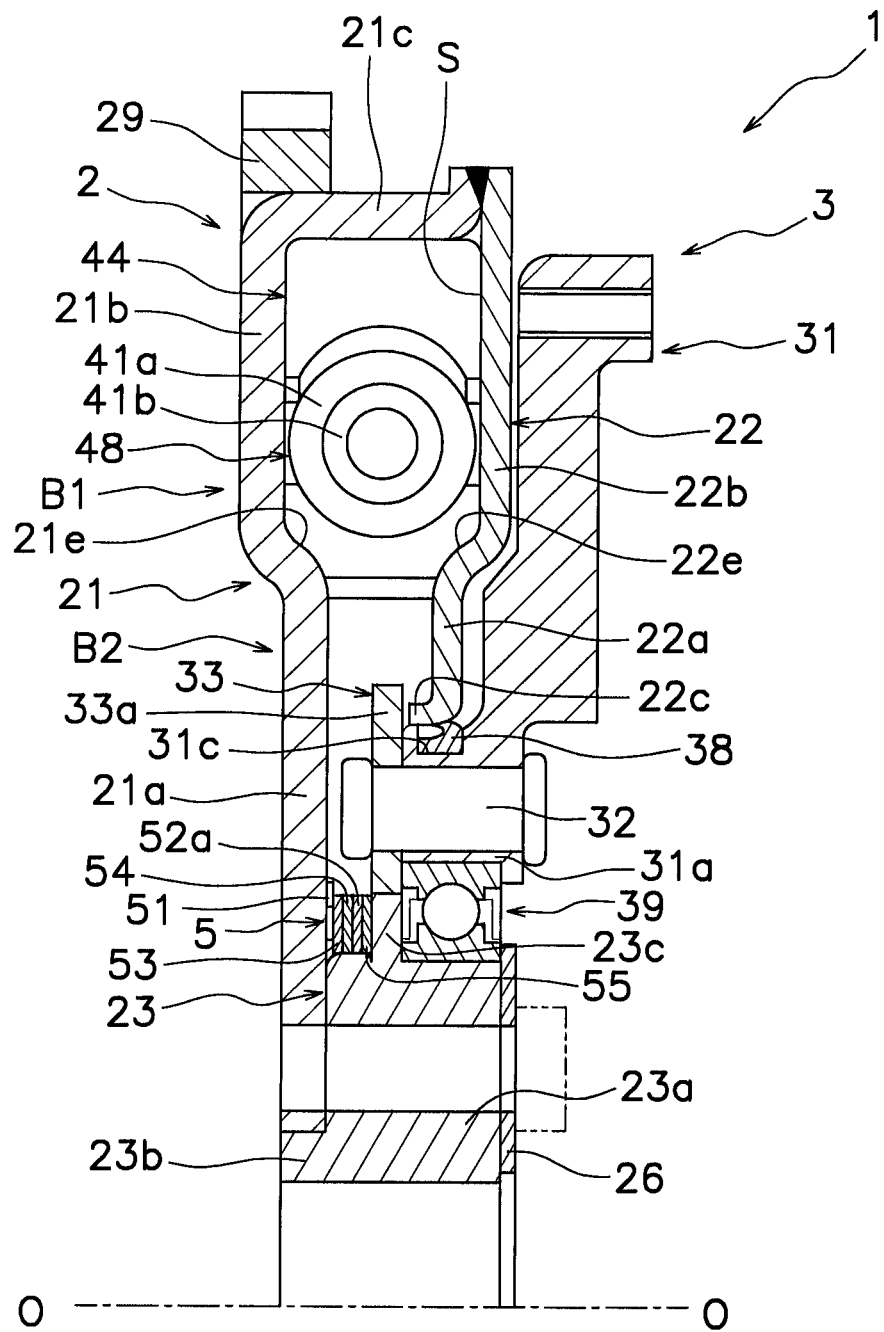
FIG. 4 is a partial cross-sectional view of the flywheel assembly.
Figure 5:
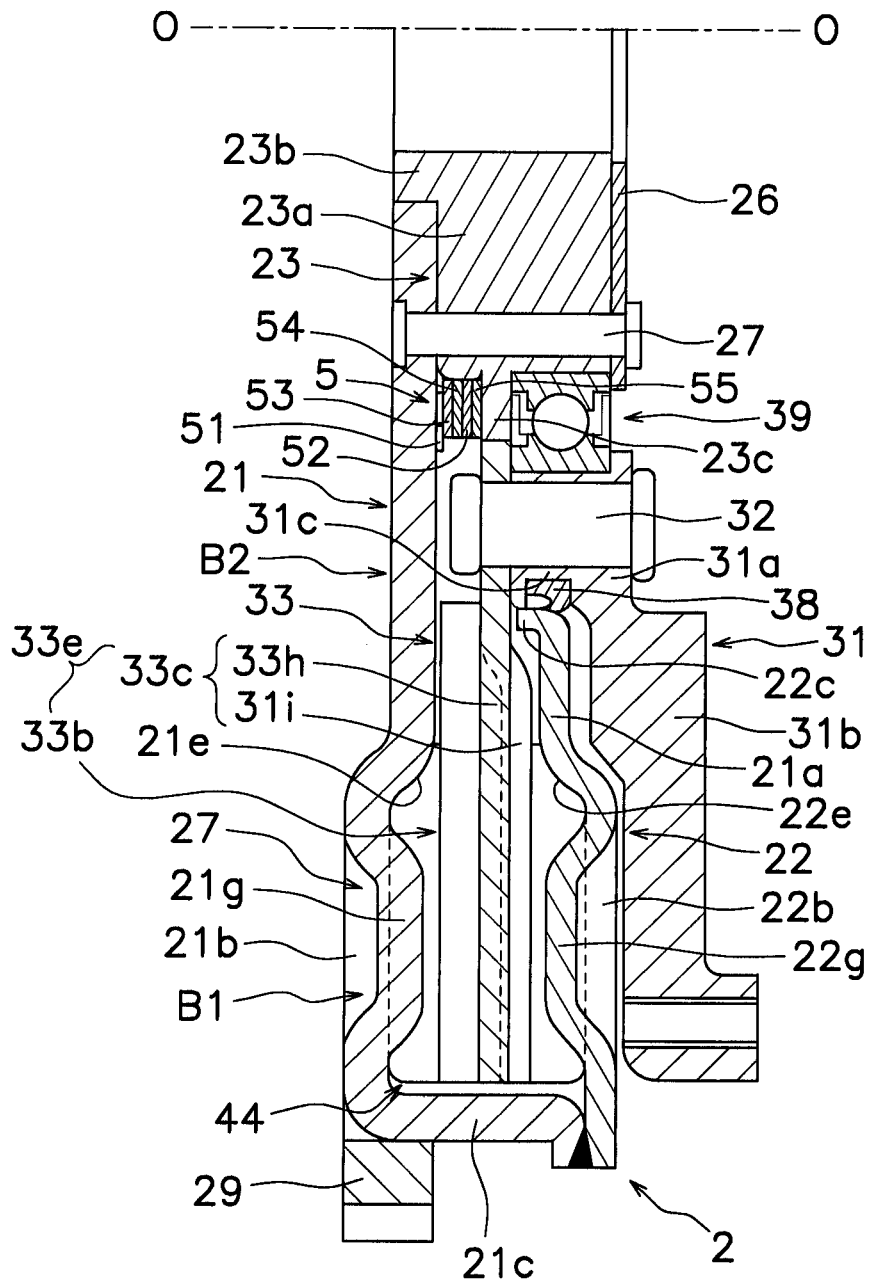
FIG. 5 is a partial cross-sectional view of the flywheel assembly.

A flywheel assembly 1 will be explained with reference to FIGS. 1 to 4. In FIGS. 2, 4, and 5, an engine (not illustrated in the figures) is disposed on the left side while a transmission (not illustrated in the figures) is disposed on the right side. The left side of FIGS. 2, 4, and 5 will be hereinafter referred to as an engine side, while the right side of FIGS. 2, 4, and 5 will be hereinafter referred to as a transmission side. Further, as illustrated in FIG. 1, a counterclockwise direction will be defined as a first rotational direction R1, while a clockwise direction will be defined as a second rotational direction R2. A first flywheel 2 is configured to be driven and rotated in the first rotational direction R1 by power inputted thereto from the engine. FIGS. 1 and 2 illustrate a neutral state of applying no external force to the first flywheel 2 and a second flywheel 3. For example, power inputted from the engine can be herein assumed as the external force.

The flywheel assembly 1 is so-called a wet-type dual mass flywheel. The flywheel assembly 1 is a device for transmitting power generated in the engine to the transmission through a clutch device (not illustrated in the figures). As illustrated in FIG. 1, the flywheel assembly 1 includes the first flywheel 2 (an exemplary first rotor), the second flywheel 3, a damper mechanism 4, and a friction generating mechanism 5. The first flywheel 2 functions as an input member of the damper mechanism 4, while the second flywheel 3 functions as an output member of the damper mechanism 4. Therefore, it could be also said that the first flywheel 2 and the second flywheel 3 form the damper mechanism 4.

<First Flywheel>

The first flywheel 2 is a member into which power generated in the engine is inputted. The first flywheel is fixed to a crankshaft (not illustrated in the figures) of the engine by bolts 28. The first flywheel 2 includes a first plate 21, a second plate 22, a support member 23, a presser plate 26, a first support part 25, a second support part 30, and two stopper parts 27. A ring gear 29 is fixed to the outer peripheral part of the first flywheel 2 by welding.

The first plate 21 has a first plate main body 21a, two first lateral portions 21b, a tubular portion 21c axially extended from the outer peripheral part of the first plate main body 21a and that of each first lateral portion 21b, and two first contact portions 21g.

The first lateral portions 21b are further protruded towards the engine than the first plate main body 21a. The first lateral portions 21b are formed by, for instance, stamping. The two first lateral portions 21b are disposed at equal pitches in the rotational direction. The first lateral portion 21b is formed in a range corresponding to the first spring assembly SA1 and the second spring assembly SA2 (to be described). The first lateral portion 21b has a slope 21e, which is slanted with respect to the axial direction, in the inner peripheral part thereof. The slope 21e can slide with first spring seats 44 (to be described), a first intermediate spring seat 43 (to be described), second spring seats 42 (to be described), and a second intermediate spring seat 46 (to be described).

The first contact portion 21g is a portion for supporting an end of the first spring assembly SA1 and that of the second spring assembly SA2, and is extended towards the transmission from the first lateral portion 21b. The first contact portion 21g is integrally formed with the first lateral portion 21b (a first accommodation portion B1). The first contact portion 21g is contactable with the first spring seat 44 and the second spring seat 42 in the rotational direction, and is disposed in the vicinity of the roughly rotation-directional center of the first lateral portion 21b. The first contact portion 21g is disposed between the first spring assembly SA1 and the second spring assembly SA2 (more specifically, between the first spring seat 44 and the second spring seat 42 to be described), and forms the stopper part 27 together with a second contact portion 22g (to be described) of the second plate 22.

The second plate 22 is an annular member fixed to the tubular portion 21c, and has a second plate main body 22a, two second lateral portions 22b, an inner tubular portion 22c, and two second contact portions 22g.

The second lateral portions 22b are portions further protruded towards the transmission than the second plate main body 22a, and are formed by, for instance, stamping. The two second lateral portions 22b are disposed at equal pitches in the rotational direction. The second lateral portion 22b is formed in a range corresponding to the first spring assembly SA1 and the second spring assembly SA2. The second lateral portion 22b has a slope 22e, which is slanted with respect to the axial direction, in the inner peripheral part thereof. The slope 22e is a surface paired with each slope 21e, and is slidable with the first spring seats 44, the first intermediate spring seat 43, the second spring seats 42, and the second intermediate spring seat 46.

The second contact portion 22g is a portion for supporting an end of the first spring assembly SA1 and that of the second spring assembly SA2, and is protruded towards the engine from the second lateral portion 22b. The second contact portion 22g is integrally formed with the second lateral portion 22b (the first accommodation portion B1). The second contact portion 22g is contactable with the first spring seat 44 in the rotational direction, and is disposed in the vicinity of the roughly rotation-directional center of the second lateral portion 22b. The second contact portion 22g is disposed while being axially opposed to the first contact portion 21g. The second contact portion 22g is axially disposed away from the first contact portion 21g at a predetermined interval. The second contact portion 22g is disposed between the first spring assembly SA1 and the second spring assembly SA2 (more specifically, between the first spring seat 44 and the second spring seat 42), and forms the stopper part 27 together with the first contact portion 21g of the first plate 21.

The second lateral portions 22b are disposed while being axially opposed to the first lateral portions 21b. Therefore, relatively large spaces, in which the first spring assemblies SA1 and the second spring assemblies SA2 are disposed, can be formed in the outer peripheral part of the first flywheel 2 by the first lateral portions 21b and the second lateral portions 22b.

The inner tubular portion 22c is a tubular portion extended towards the engine from the inner peripheral part of the second plate main body 22a, and makes contact with a seal ring 38 (to be described).

The support member 23 has an annular support member main body 23a, an annular protrusion 23b and an annular slide portion 23c. The support member main body 23a is fixed to the crankshaft together with the first plate 21 by the bolts 28. The annular protrusion 23b is an annular portion protruded towards the engine from the inner peripheral part of the support member main body 23a, and radially positions the first plate 21. The slide portion 23c is a portion radially extended from the support member main body 23a, and slides with a second friction plate 55 of the friction generating mechanism 5. A bearing 39 is fitted onto the outer peripheral part of the support member main body 23a.

The presser plate 26 is a member for axially pressing the bearing 39, and is fixed to the crankshaft together with the first plate 21 and the support member 23 by the bolts 28. Further, the presser plate 26 is fixed to the first plate 21 and the support member 23 by rivets 24.

The first support part 25 is a part for supporting the first spring assemblies SA1 in the rotational direction, and includes first support plates 25a. The first support plate 25a is fixed to the first plate 21 and the second plate 22 while making contact with the first spring seat 44 in the rotational direction.

The second support part 30 is a part for supporting the second spring assemblies SA2 in the rotational direction, and includes second support plates 30a. The second support plate 30a is fixed to the first plate 21 and the second plate 22 while making contact with the second spring seat 42 in the rotational direction.

The first support part 25 and the second support part 30 are disposed at predetermined intervals in the rotational direction, while being disposed in positions opposed to each other through a rotary axis O. The two stopper parts 27 are disposed at predetermined intervals in the rotational direction while being disposed in positions opposed through the rotary axis O. The stopper part 27 is disposed between the first support part 25 and the second support part 30 (more specifically, in the vicinity of the rotation-directional center between the first support part 25 and the second support part 30).

The first spring assembly SA1 is disposed between the first support part 25 and each stopper part 27 in the rotational direction. When only the second spring assembly SA2 is compressed between the first flywheel 2 and the second flywheel 3 in the rotational direction, the first spring assembly SA1 is supported by the first support part 25 and the stopper part 27 in the rotational direction while being preliminarily compressed between the first support part 25 and the stopper part 27 in the rotational direction.

The second spring assembly SA2 is disposed between the second support part 30 and each stopper part 27 in the rotational direction. When only the first spring assembly SA1 is compressed between the first flywheel 2 and the second flywheel 3 in the rotational direction, the second spring assembly SA2 is supported by the second support part 30 and the stopper part 27 in the rotational direction while being preliminarily compressed between the second support part 30 and the stopper part 27 in the rotational direction.

<Second Flywheel>

The second flywheel 3 is a member disposed rotatably with respect to the first flywheel 2, and includes a second flywheel main body 31 and an output plate 33 (an exemplary second rotor). The second flywheel 3 is supported by the bearing 39 while being rotatable with respect to the first flywheel 2.

The second flywheel main body 31 is an annular member disposed on the transmission side of the second plate 22, and includes a support portion 31a and a friction portion 31b.

The support portion 31a is an annular portion that is supported by the bearing 39 while being rotatable with respect to the first flywheel 2. The support portion 31a is disposed on the inner peripheral side of the second plate 22. The seal ring 38 is fitted into a groove 31c of the support portion 31a. The seal ring 38 seals an accommodation space S of the first flywheel 2 and the external space of the first flywheel 2. The accommodation space S is filled with lubricating oil. The output plate 33 is fixed to the support portion 31a by rivets 32.

The friction portion 31b is an annular portion onto which a friction facing (not illustrated in the figures) of a clutch disc assembly is pressed, and is formed on the outer periphery of the support portion 31a. The friction portion 31b is disposed on the transmission side of the second plate 22 while being protruded towards the transmission than the support portion 31a.

The output plate 33 is disposed within the accommodation space S while being fixed to the support portion 31a. The output plate 33 has an annular main body 33a and two transmission parts 33e radially extended from the main body 33a.

The main body 33a is an annular portion fixed to the support portion 31a. A plurality of notches 33d are formed in the inner peripheral part of the main body 33a while being aligned at equal intervals in the circumferential direction. Protrusions 52b (to be described) of a second bushing 52 are inserted into the notches 33d. Accordingly, the second bushing 52 and the second flywheel 3 are unitarily rotatable.

The transmission part 33e is a part to which power transmitted to the first flywheel 2 is further transmitted through the first spring assembly SA1 and the second spring assembly SA2. In the neutral state that no external force acts on the damper mechanism 4, the transmission part 33e is disposed axially between the first contact portion 21g and each second contact portion 22g. It could be also said that the transmission part 33e is axially opposed to the first contact portion 21g and the second contact portion 22g. The rotation-directional center line of the transmission part 33e is arranged roughly in the same position as that of the stopper part 27.

When described more specifically, the transmission part 33e has a first protrusion 33c and a pair of second protrusions 33b. The first protrusion 33c and the second protrusions 33b are formed by, for instance, stamping.

The first protrusion 33c is a plate-shaped portion protruded radially outwards from the main body 33a. The first protrusion 33c has: a center portion 33h disposed in the same axial position as the main body 33a; and a pair of outer portions 33i formed for axially protruding towards the transmission than the center portion 33h. The outer portions 33i of the pair are disposed on the both sides of the center portion 33h in the rotational direction.

The second protrusion 33b is a portion axially extended towards the engine from a rotation-directional end of the first protrusion 33c (more specifically, the outer portion 33i), and has a contact portion 33f and a reinforcement portion 33g. The contact portion 33f is a radially extended portion and has a contact surface 33j contactable with the first spring seat 44 (to be described) in the rotational direction. The thickness direction of the contact portion 33f (i.e., a normal line direction of the contact surface 33j) is roughly matched with the rotational direction. The reinforcement portion 33g is a portion coupling a radially inner end of the contact portion 33f and the outer peripheral part of the main body 33a, and is extended from the radial inner end of the contact portion 33f to the direction that the contact surface 33j is oriented. As illustrated in FIG. 3, the reinforcement portion 33g has a curved portion. The axial dimension of the reinforcement portion 33g is equal to that of the contact portion 33f. The outer portion 33i is further protruded towards the transmission than the center portion 33h. Therefore, a relatively large axial dimension can be reliably produced for the contact portion 33f. Accordingly, a large area can be set for the contact surface 33j.

Figure 6:
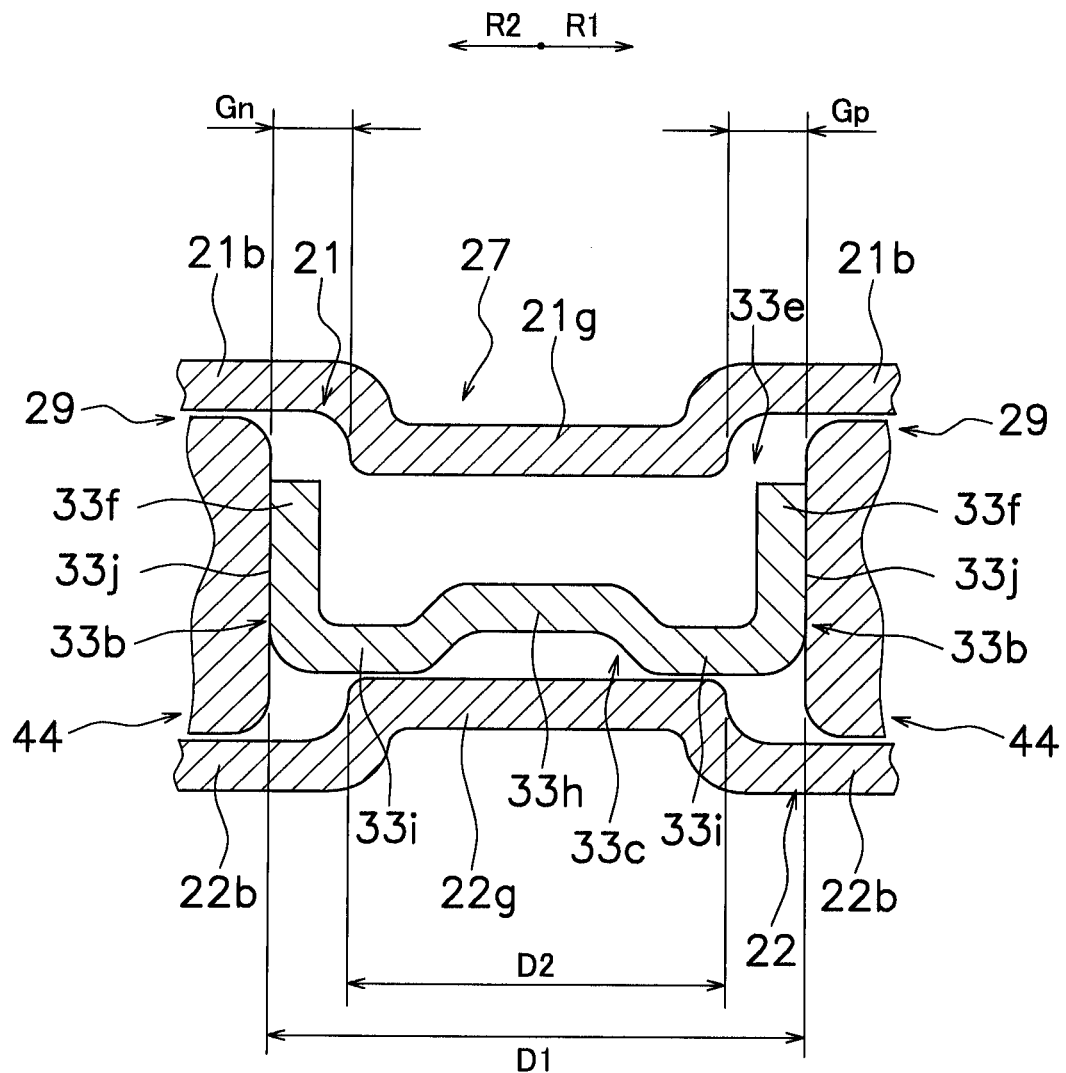
FIG. 6 is a cross-sectional view of FIG. 3 sectioned along a line VI-VI.
Figure 7:
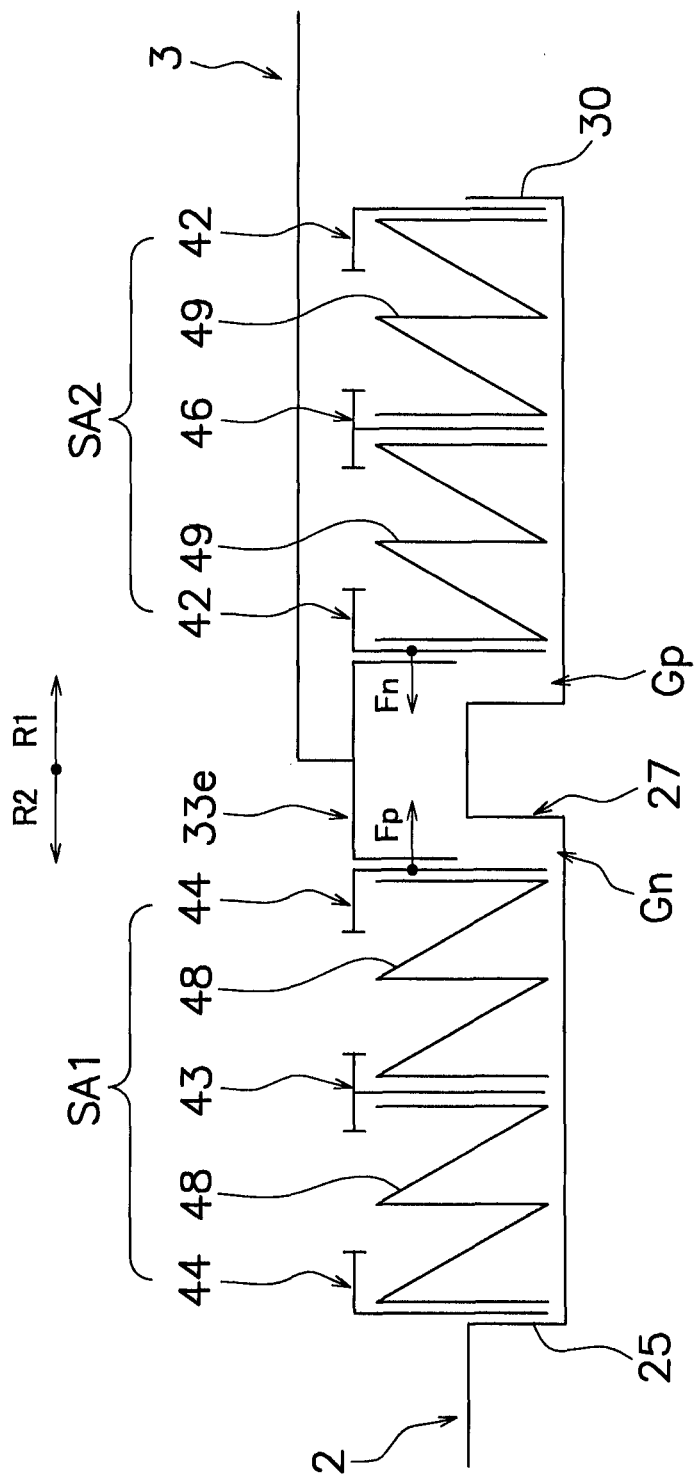
FIG. 7 is a mechanical circuit diagram of a damper mechanism (a neutral state).

Further, as illustrated in FIG. 6, a rotation-directional dimension D1 of the transmission part 33e is set to be greater than a rotation-directional dimension D2 of the stopper part 27. When described more specifically, the rotation-directional dimension D1 between the two contact surfaces 33j is set to be greater than the rotation-directional dimension D2 of the stopper part 27 (more specifically, the rotation-directional dimension of the first contact portion 21g and that of the second contact portion 22g). It is possible to reliably produce a positive-side gap Gp (an exemplary second gap) and a negative-side gap Gn (an exemplary first gap) by setting the dimension D1 to be greater than the dimension D2. A dimension of the negative-side gap (first gap) Gn is roughly equal to a dimension of the positive-side gap (second gap) Gp in the neutral state.

As described above, the first spring assembly SA1 is disposed between the first support part 25 and the transmission part 33e in the rotational direction while being preliminarily compressed. The second spring assembly SA2 is disposed between the second support part 30 and the transmission part 33e in the rotational direction while being preliminarily compressed. Further, the positive-side gap Gp is reliably produced between the stopper part 27 and the second spring assembly SA2, whereas the negative-side gap Gn is reliably produced between the stopper part 27 and the first spring assembly SA1. Therefore, in the neutral state, the transmission part 33e is interposed between the first spring assembly SA1 and the second spring assembly SA2 in the rotational direction, while being elastically supported by the first spring assembly SA1 and the second spring assembly SA2 in the rotational direction within the range of the positive-side gap Gp and that of the negative-side gap Gn. In other words, at a torsional angle of roughly 0 degrees, an end of the first spring assembly SA1 and that of the second spring assembly SA2 are kept in contact with the transmission part 33e without being separated away from the transmission part 33e.

A rotation-directional dimension of the transmission part 33e is less than a rotation-directional dimension of the stopper part 27. A rotation-directional dimension between the first support part 25 and the stopper part 27 is less than a rotation-directional dimension of the first elastic member in a free state. A rotation-directional dimension between the second support part 30 and the stopper part 27 is less than a rotation-directional dimension of the second elastic member in a free state.

<Damper Mechanism>

The damper mechanism 4 is a mechanism for elastically coupling the first flywheel 2 and the second flywheel 3 in the rotational direction, and includes a pair of first spring assemblies SA1 (an exemplary first elastic member) and a pair of second spring assemblies SA2 (an exemplary second elastic member). The damper mechanism 4 also includes the aforementioned first plate 21, second plate 22, and output plate 33.

The first spring assemblies SA1 of the pair elastically couple the first flywheel 2 and the second flywheel 3 in the rotational direction. The first spring assemblies SA1 are disposed while being configured to be actuated only on the roughly positive side of torsional characteristics. Each first spring assembly SA1 includes two first spring sets 48, two first spring seats 44 and the first intermediate spring seat 43.

The two first spring sets 48 are configured to act in series while being disposed between the first flywheel 2 and the second flywheel 3. Each first spring set 48 includes a first outer spring 41a and a first inner spring 41b. The inner spring 41b is configured to act in parallel to the first outer spring 41a while being disposed inside the first outer spring 41a.

The first spring seat 44 supports one end of the first spring set 48 while being attached to the end of the first spring set 48. One of the first spring seats 44 is interposed between the first spring set 48 and the first support part 25. The other of the first spring seats 44 is interposed between the first spring set 48 and the transmission part 33e in the neutral state. The first intermediate spring seat 43 supports ends of the adjacent first spring sets 48, while being disposed between the ends of the adjacent first spring sets 48. Positive-side stopper torque can be reliably produced for the damper mechanism 4 by the rotation-directional contact between the two first spring seats 44 and the first intermediate spring seat 43.

The first spring assembly SA1 is disposed in the first accommodation portion B1 formed by the first lateral portion 21b, the second lateral portion 22b, and the tubular portion 21c while being preliminarily compressed. In the neutral state, the first spring assembly SA1 is disposed between the first support part 25 and the transmission part 33e in the rotational direction while being preliminarily compressed. Under the condition, the first spring assembly SA1 is supported in rotational, axial and radial directions by the first support part 25, the transmission part 33e, the first lateral portion 21b, the second lateral portion 22b, and the tubular portion 21c. Further, the negative-side gap Gn is reliably produced between the first spring assembly SA1 and the stopper part 27.

On the other hand, when only the second spring assemblies SA2 of the pair are actuated, the first spring assembly SA1 is disposed between the first support part 25 and the stopper part 27 in the rotational direction while being compressed. Under the condition, the first spring assembly SA1 is supported in rotational, axial and radial directions by the first support part 25, the stopper part 27, the first lateral portion 21b, the second lateral portion 22b, and the tubular portion 21c.

The second spring assemblies SA2 of the pair elastically couple the first flywheel 2 and the second flywheel 3 in the rotational direction. The second spring assemblies SA2 are disposed while being configured to be actuated only on the roughly negative side of torsional characteristics. Each second spring assembly SA2 includes two second spring sets 49, two second spring seats 42 and the second intermediate spring seat 46.

The two second spring sets 49 are configured to act in series while being disposed between the first flywheel 2 and the second flywheel 3. Each second spring set 49 includes a second outer spring 45a and a second inner spring 45b. The second inner spring 45b is configured to act in parallel to the second outer spring 45a while being disposed inside the second outer spring 45a.

The second spring seat 42 supports one end of the second spring set 49, while being attached to the end of each second spring set 49. One of the second spring seats 42 is interposed between the second spring set 49 and the second support part 30. The other of the second spring seats 42 is interposed between the second spring set 49 and the transmission part 33e in the neutral state. The second intermediate spring seat 46 supports ends of the adjacent second spring sets 49, while being disposed between the ends of the adjacent second spring sets 49. Negative-side stopper torque can be reliably produced for the damper mechanism 4 by the rotation-directional contact between the two second spring seats 42 and the second intermediate spring seat 46.

The second spring assembly SA2 is disposed in a second accommodation portion B2 formed by the first lateral portion 21b, the second lateral portion 22b and the tubular portion 21c while being preliminarily compressed. In the neutral state, the second spring assembly SA2 is disposed between the second support part 30 and the transmission part 33e in the rotational direction while being preliminarily compressed. Under the condition, the second spring assembly SA2 is supported in rotational, axial and radial directions by the second support part 30, the transmission part 33e, the first lateral portion 21b, the second lateral portion 22b, and the tubular portion 21c. Further, the positive-side gap Gp is reliably produced between the second spring assembly SA2 and the stopper part 27.

On the other hand, when only the first spring assemblies SA1 of the pair are actuated, the second spring assembly SA2 is disposed between the second support part 30 and the stopper part 27 in the rotational direction, while being compressed. Under the condition, the second spring assembly SA2 is supported in rotational, axial and radial directions by the second support part 30, the stopper part 27, the first lateral portion 21b, the second lateral portion 22b, and the tubular portion 21c.

<Friction Generating Mechanism>

The friction generating mechanism 5 is a mechanism for generating rotation-directional resistive force between the first flywheel 2 and the second flywheel 3, and includes a first bushing 53, the second bushing 52, a first friction plate 54, the second friction plate 55, and a cone spring 51.

The first bushing 53 is disposed while being unitarily rotatable with the first flywheel 2, and is disposed on the engine side of the first friction plate 54.

The second bushing 52 is disposed while being unitarily rotatable with the second flywheel 3, and has a first bushing main body 52a having an annular shape and the plural protrusions 52b protruded radially outwards from the first bushing main body 52a. The first bushing main body 52a is disposed axially between the first friction plate 54 and the second friction plate 55, and is slidable with the first friction plate 54 and the second friction plate 55. The protrusions 52b are respectively inserted into the aforementioned notches 33d.

The first friction plate 54 is interposed axially between the first bushing 53 and the second bushing 52, and is disposed rotatably with respect to the first flywheel 2 and the second flywheel 3. The second friction plate 55 is interposed axially between the second bushing 52 and the slide portion 23c, and is disposed rotatably with respect to the second bushing 52 and the first flywheel 2. The cone spring 51 is disposed axially between the first bushing 53 and the first plate 21, while pressing the first bushing 53 towards the transmission.

<Actions>

Figure 12:
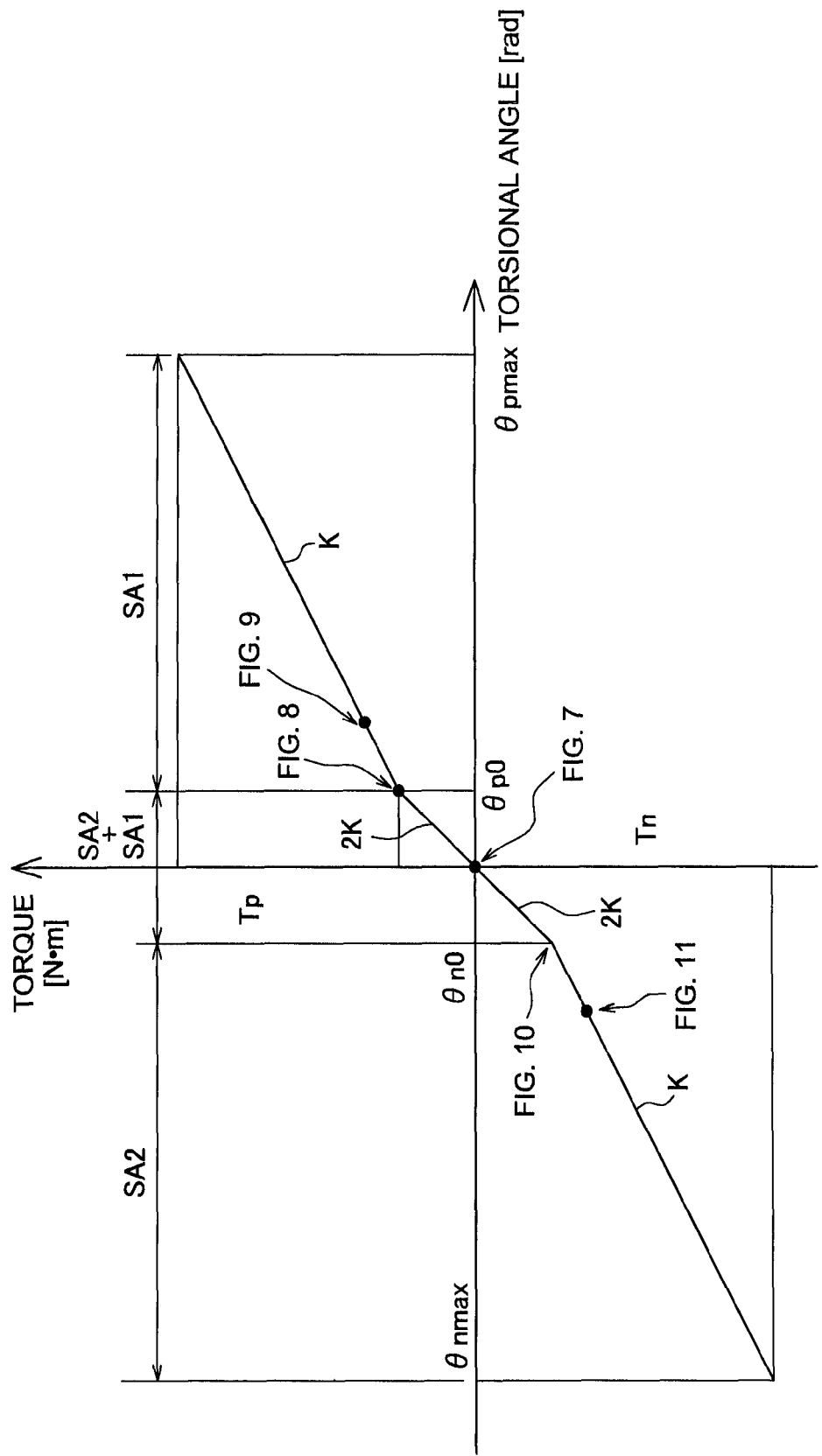
FIG. 12 is a torsional characteristic chart of the damper mechanism.

Actions of the damper mechanism 4 will be explained using FIGS. 7 to 12. FIGS. 7 to 12 are mechanical circuit diagrams of the damper mechanism 4. FIG. 12 is a torsional characteristic chart of the damper mechanism 4. Hysteresis torque is omitted in FIG. 12.

(1) Neutral State

When the torsional angle of the first flywheel 2 with respect to the second flywheel 3 is 0 degrees (i.e., when the damper mechanism 4 is set to be in the neutral state), the second flywheel 3 is elastically supported in the rotational direction by the first spring assemblies SA1 and the second spring assemblies SA2. Specifically, the transmission part 33e of the second flywheel 3 is interposed between the first spring assembly SA1 and the second spring assembly SA2 (see FIG. 7).

In the neutral state, the positive-side gap Gp is reliably produced between the second spring assembly SA2 and the stopper part 27 in the rotational direction, whereas the negative-side gap Gn is reliably produced between the first spring assembly SA1 and the stopper part 27 in the rotational direction. A torsional angle corresponding to the positive-side gap Gp is defined as a positive-side gap angle $\theta p0$, while a torsional angle corresponding to the negative-side gap Gn is defined as a negative-side gap angle $\theta n0$. When the torsional angle falls within the range of the positive-side gap angle $\theta p0$ and that of the negative-side gap angle $\theta n0$, the first flywheel 2 is rotatable with respect to the second flywheel 3 while the transmission part 33e of the second flywheel 3 is interposed between the first spring assembly SA1 and the second spring assembly SA2. In other words, when the torsional angle falls within the range of the positive-side gap angle $\theta p0$ and that of the negative-side gap angle $\theta n0$, both of the first spring assemblies SA1 and the second spring assemblies SA2 are actuated.

(2) Positive Side of Torsional Characteristics

When the clutch disc assembly (not illustrated in the figures) is pressed onto the second flywheel 3, power is transmitted from the engine to the transmission through the flywheel assembly 1 and the clutch disc assembly. Specifically, the first flywheel 2 starts rotating with respect to the second flywheel 3 in the first rotational direction R1. As a result, compression is started for the first spring assembly SA1 between the first flywheel 2 and the second flywheel 3 (see FIGS. 7 and 8). When described more specifically, the two first spring sets 48 are compressed in the rotational direction between the first support part 25 of the first flywheel 2 and the transmission part 33e of the second flywheel 3. Simultaneously with this, the compressed state of the second spring assembly SA2 is gradually released between the second support part 30 and the stopper part 27. Further, friction resistance is generated in the friction generating mechanism 5 in conjunction with the relative rotation between the first flywheel 2 and the second flywheel 3. Accordingly, rotation-directional resistance (i.e., hysteresis torque) is generated between the first flywheel 2 and the second flywheel 3.

A torque Tp, which is necessary for rotating the first flywheel 2 to the positive side (i.e., in the first rotational direction R1) with respect to the second flywheel 3, is expressed by the following equation (1).

$$\begin{aligned} Tp &= R \times (Fp - Fn) \\ &= R \times K \times ((Lp + L0) - (Ln + L0)) \\ &= R \times K \times (Lp - Ln) \end{aligned} \quad (1)$$

R indicates an effective radius of the damper mechanism 4 (see FIG. 1); Lp indicates the compression amount of the first spring sets 48; Ln indicates the compression amount of the second spring sets 49; and L0 indicates the compression amount of the first spring assembly SA1 and the second spring assembly SA2 in the neutral state. Further, a spring coefficient of the first spring assembly SA1 (an entire spring coefficient of the two first spring sets 48 disposed in series) is set as K, while a spring coefficient of the second spring assembly SA2 (an entire spring coefficient of the two second spring sets 49 disposed in series) is set as K.

"Ln=−LP" is established when the rotational angle of the first flywheel 2 with respect to the second flywheel 3 falls within the range from 0 to the positive-side gap angle $\theta p0$. Therefore, the equation (1) is expressed by the following (2).

$$Tp = R \times K \times (Lp - (-Ln)) = R \times K \times 2Lp \quad (2)$$

Therefore, the gradient of a line is set to be 2K where the torsional angle falls within the range from 0 to the positive-side gap angle θp0, as represented in the torsional characteristic chart of FIG. 12.

Figure 8:
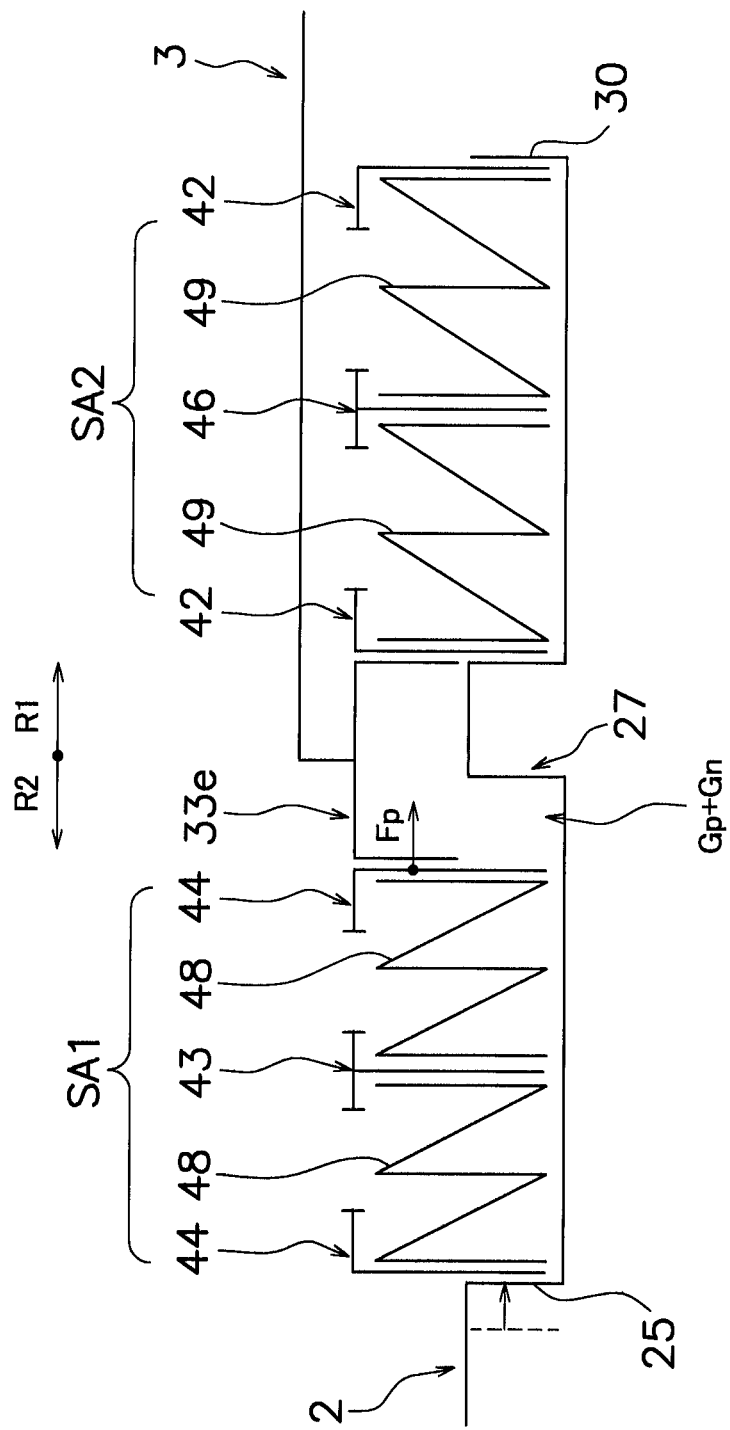
FIG. 8 is a mechanical circuit diagram of the damper mechanism (a state at a torsional angle equal to a positive-side gap angle $\theta p0$).
Figure 9:
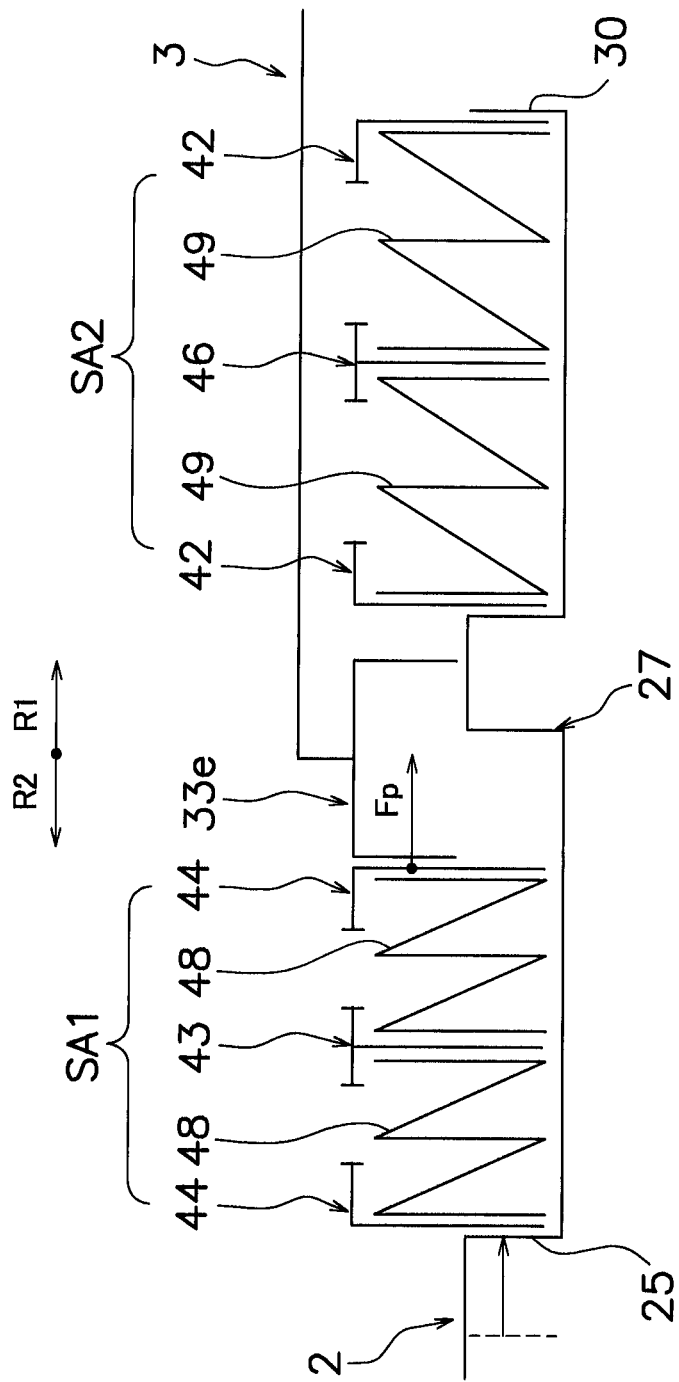
FIG. 9 is a mechanical circuit diagram of the damper mechanism (a state at a torsional angle greater than the positive-side gap angle $\theta p0$).

When the rotational angle of the first flywheel 2 with respect to the second flywheel 3 reaches the positive-side gap angle θp0, the second spring assembly SA2 (more specifically, the second spring seats 42 attached to the second spring sets 49) makes contact with the stopper part 27 and the actuation of the second spring assembly SA2 is stopped (see FIG. 8). The two second spring sets 49 are herein held between the second support part 30 and the stopper part 27 while being compressed.

When the first flywheel 2 is further rotated with respect to the second flywheel 3 from the position at the positive-side gap angle θp0, the transmission part 33e is separated away from the second spring assembly SA2 (more specifically, the second spring seat 42 attached to the second spring set 49). Accordingly, only the first spring assembly SA1 is actuated between the first flywheel 2 and the second flywheel 3 (see FIG. 9). Specifically, the first spring assembly SA1 is further compressed between the first support part 25 and the stopper part 27. However, the second spring assembly SA2 is kept in status quo between the second support part 30 and the stopper part 27.

The torque Tp, which is necessary for rotating the first flywheel 2 to the positive side (i.e., in the first rotational direction R1) with respect to the second flywheel 3, is herein expressed by the following equation (3).

$$Tp = R \times Fp = R \times K \times (Lp + L0) \quad (3)$$

Therefore, the gradient of a line is set to be K where the torsional angle falls within the range from the positive-side gap angle θp0 to a positive-side maximum torsional angle θpmax, as represented in the torsional characteristic chart of FIG. 12.

When the first flywheel 2 is further rotated with respect to the second flywheel 3, the first spring seats 44 and the first intermediate spring seat 43 will shortly thereafter make contact with each other in the rotational direction. As a result, the two first spring seats 44 and the first intermediate spring seat 43 are interposed between the first support part 25 of the first flywheel 2 and the transmission part 33e in the rotational direction, and the relative rotation between the first flywheel 2 and the second flywheel 3 is stopped at the positive-side maximum torsional angle θpmax. Accordingly, power is transmitted from the first flywheel 2 to the second flywheel 3 through the first spring seats 44 and the intermediate spring seat 43.

(3) Negative Side of Torsional Characteristics

On the other hand, when an engine brake, for instance, is used in a clutch coupled state, reverse-rotational driving force is transmitted from the transmission side to the second flywheel 3. Accordingly, the second flywheel 3 is driven and rotated with respect to the first flywheel 2 in the first rotational direction R1 from the state at the positive-side maximum torsional angle θpmax. In other words, the first flywheel 2 is rotated with respect to the second flywheel 3 in the second rotational direction R2 from the state at the positive-side maximum torsional angle θpmax. As a result, the position of the neutral state at a torsional angle of 0 degrees is passed, and compression is started for the second spring assembly SA2 between the first flywheel 2 and the second flywheel 3 (see FIGS. 7 and 10). Simultaneously with this, the compressed state of the first spring assembly SA1 is gradually released between the first support part 25 and the stopper part 27.

A torque Tn, which is necessary for rotating the first flywheel 2 to the negative side (i.e., in the second rotational direction R2) with respect to the second flywheel 3, is herein expressed by the following equation (4).

$$Tn = R \times (Fn - Fp) \quad (4)$$
$$= R \times K \times ((Ln + L0) - (Lp + L0))$$
$$= R \times K \times (Ln - Lp)$$

"Lp=−Ln" is established where the rotational angle of the first flywheel 2 with respect to the second flywheel 3 falls within the range of the negative-side gap angle θn0. Therefore, the equation (4) is expressed by the following equation (5).

$$Tn = R \times K \times (Ln - (-LP)) = R \times K \times 2Ln \quad (5)$$

Therefore, the gradient of a line is set to be 2K where the torsional angle falls within the range from 0 to the negative-side gap angle θn0 similarly to the case of the positive side as represented in the torsional characteristic chart of FIG. 12.

Figure 10:
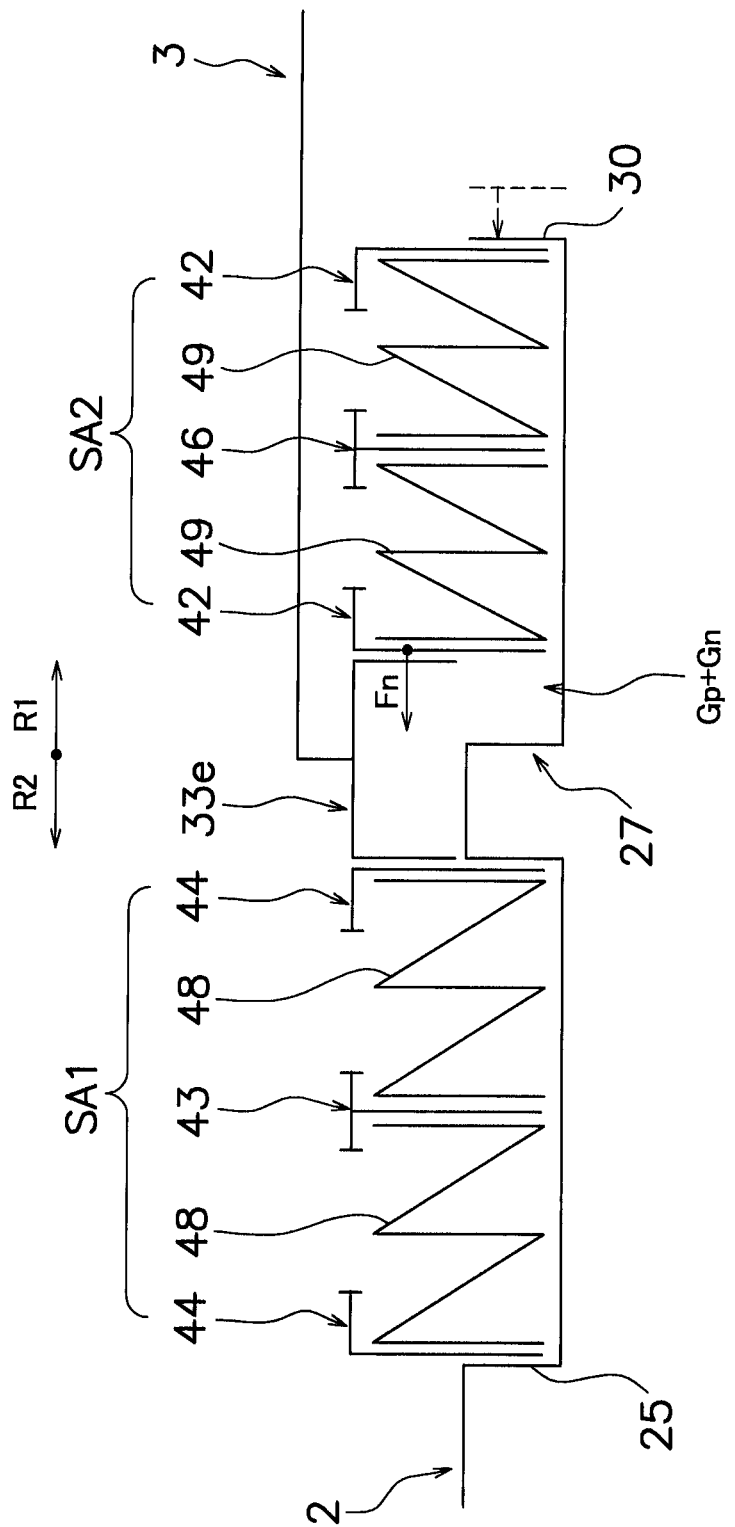
FIG. 10 is a mechanical circuit diagram of the damper mechanism (a state at a torsional angle equal to a negative-side gap angle θn0).
Figure 11:
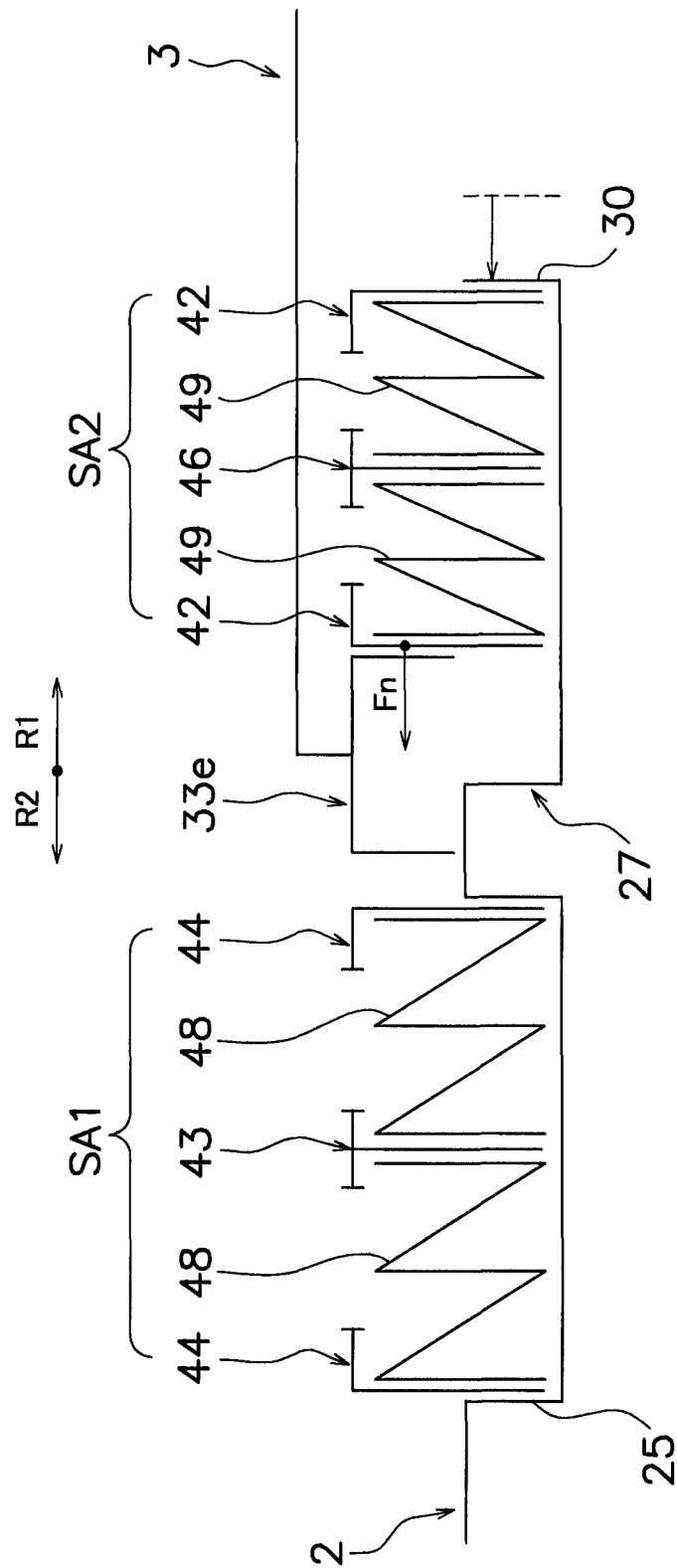
FIG. 11 is a mechanical circuit diagram of the damper mechanism (a state at a torsional angle less than the negative-side gap angle θn0).

When the rotational angle of the first flywheel 2 with respect to the second flywheel 3 reaches the negative-side gap angle θn0, the first spring assembly SA1 (more specifically, the first spring seat 44 attached to the first spring set 48) makes contact with the stopper part 27 and the actuation of the first spring assembly SA1 is stopped (see FIG. 10). The two first spring sets 48 are herein held between the first support part 25 and the stopper part 27 while being compressed.

When the first flywheel 2 is further rotated with respect to the second flywheel 3 from the position at the negative-side gap angle θn0, the transmission part 33e is separated away from the first spring assembly SA1 (more specifically, the first spring seat 44 attached to the first spring set 48). Accordingly, only the second spring assembly SA2 is actuated between the first flywheel 2 and the second flywheel 3 (see FIG. 11). Specifically, the second spring assembly SA2 is further compressed between the second support part 30 and the stopper part 27. However, the first spring assembly SA1 is kept in status quo between the first support part 25 and the stopper part 27.

The torque Tn, which is necessary for rotating the first flywheel 2 to the negative side (i.e., in the second rotational direction R2) with respect to the second flywheel 3, is expressed by the following equation (6).

$$Tn = R \times Fn = R \times K \times (Ln + L0) \quad (6)$$

Therefore, the gradient of a line is set to be K where the torsional angle falls within the range from the negative-side gap angle θn0 to a negative-side maximum torsional angle θnmax as represented in the torsional characteristic chart of FIG. 12.

When the first flywheel 2 is further rotated with respect to the second flywheel 3, the adjacent second spring seats 42 and the second intermediate spring seat 46 will shortly thereafter make contact with each other in the rotational direction. As a result, the second spring seats 42 and the second intermediate spring seat 46 are interposed between the second support part 30 of the first flywheel 2 and the transmission part 33e in the rotational direction, and the relative rotation between the first flywheel 2 and the second flywheel 3 is stopped at the negative-side maximum torsional angle θnmax. Accordingly, power is transmitted from the first flywheel 2 to the second flywheel 3 through the first spring seats 44 and the first intermediate spring seat 43.

<Features>

As explained above, in the present damper mechanism 4, only the first spring assembly SA1 is compressed in most of the positive-side region of torsional characteristics, whereas only the second spring assembly SA2 is compressed in most of the negative-side region of torsional characteristics. In other words, the second spring assembly SA2 is hardly actuated on the positive side of torsional characteristics, whereas the first spring assembly SA1 is hardly actuated on the negative side of torsional characteristics. Accordingly, it is possible to reduce the frequency that the first spring assembly SA1 and the second spring assembly SA2 are actuated. It is thereby possible to enhance the durability of the damper mechanism 4.

In addition to the above, in the neutral state that no rotational force acts on the first flywheel 2 and the second flywheel 3, gaps (the positive-side gap Gp and the negative-side gap Gn) are reliably produced between the stopper part 27 and the first spring assembly SA1 in the rotational direction and between the stopper part 27 and the second spring assembly SA2 in the rotational direction. As a result, the second flywheel 3 is elastically supported by the first spring assembly SA1 and the second spring assembly SA2 at a torsional angle of roughly 0 degrees. In other words, at the torsional angle of roughly 0 degrees, a state is maintained that either the first spring seat 44 of the first spring assembly SA1 or the second spring seat 42 of the second spring assembly SA2 makes contact with the transmission part 33e. Accordingly, at the torsional angle of roughly 0 degrees, it is possible to prevent a situation that the first spring assembly SA1 and the second spring assembly SA2 collide against the transmission part 33e and abnormal noise is thereby produced.

As described above, the damper mechanism 4 can enhance its durability, and simultaneously, enhance its noise vibration performance. Further, similar advantageous effects can be achieved even by the flywheel assembly 1 embedded with the damper mechanism 4.

Other Exemplary Embodiments

The present invention is not limited to the aforementioned exemplary embodiment, and a variety of changes and modifications can be herein made without departing from the scope of the present invention.

(1) In the aforementioned exemplary embodiment, the damper mechanism according to the present invention has been explained using the flywheel assembly 1. However, a device to which the damper mechanism according to the present invention is applicable is not limited to a flywheel assembly. For example, the damper mechanism can be also applied to the other devices such as a clutch disc assembly and a torque limiter.

(2) In the aforementioned exemplary embodiment, the first spring assembly SA1 as an exemplary first elastic member includes the two first spring sets 48 disposed to act in series. However, the first spring assembly SA1 should include at least one first spring set 48. Further, the first spring set 48 is formed by a set of so-called dual springs, but can be formed by a single spring. Moreover, the two first spring seats 44 and the first intermediate spring seat 43 can be omitted.

Further, the second spring assembly SA2 as an exemplary second elastic member includes the two second spring sets 49 disposed to act in series. However, the second spring assembly SA2 should include at least one second spring set 49. Yet further, the second spring set 49 is formed by a set of so-called dual springs, but can be formed by a single spring. Moreover, the two second spring seats 42 and the second intermediate spring seat 46 can be omitted.

(3) In the aforementioned exemplary embodiment, the first spring assembly SA1 acting on the positive side and the second spring assembly SA2 acting on the negative side have the same level of stiffness, but can have different levels of stiffness. Further, in the aforementioned exemplary embodiment, the magnitude of the positive-side gap angle θp0 and that of the negative-side gap angle θn0 are equal to each other, but can be different from each other.

(4) In the aforementioned exemplary embodiment, the first support part 25, the second support part 30, and the two stopper parts 27 are provided. However, the number of the first support part 25, that of the second support part 30 and that of the stopper part 27 are not limited to those in the aforementioned exemplary embodiment. For example, the number of the stopper parts 27 can be one. Alternatively, the number of the first support part 25, that of the second support part 30, and that of the stopper part 27 can be respectively greater than those in the aforementioned exemplary embodiment.

Figure 13:
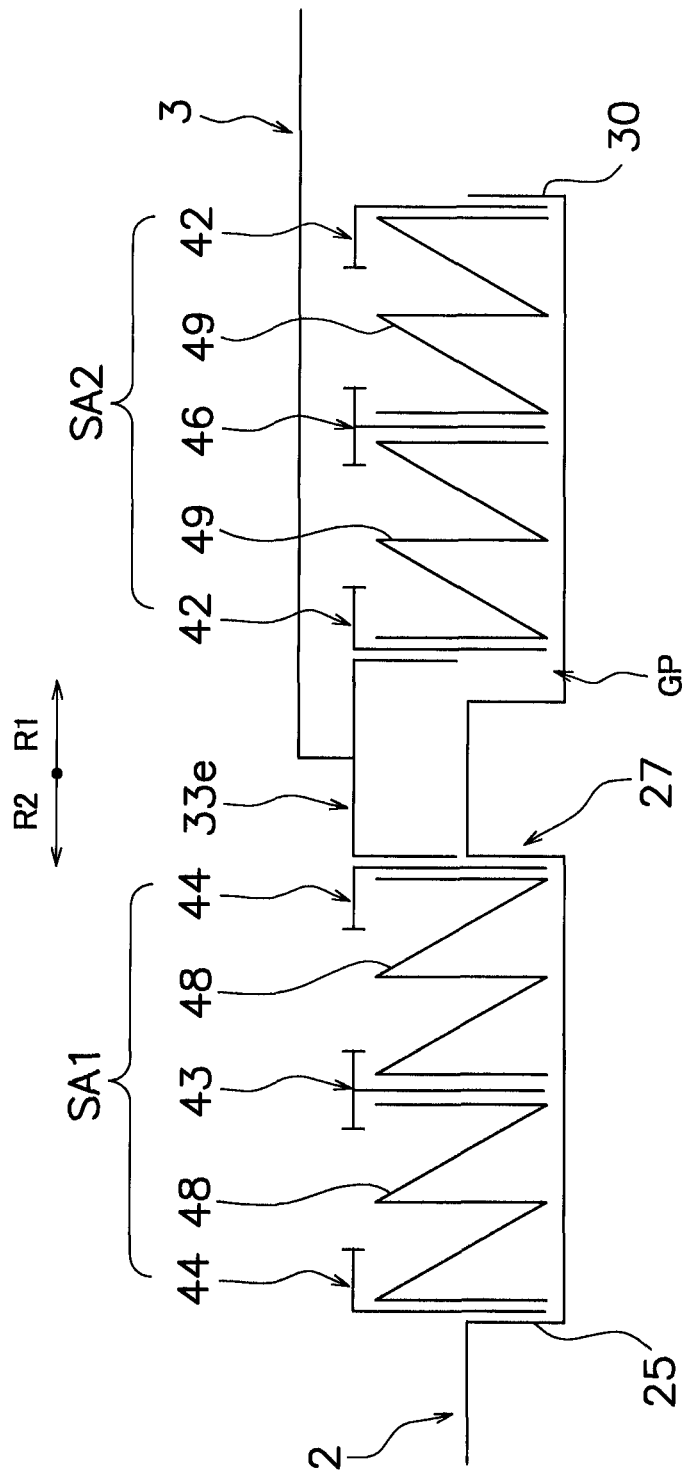
FIG. 13 is a mechanical circuit diagram of the damper mechanism (other exemplary embodiment).
Figure 14:
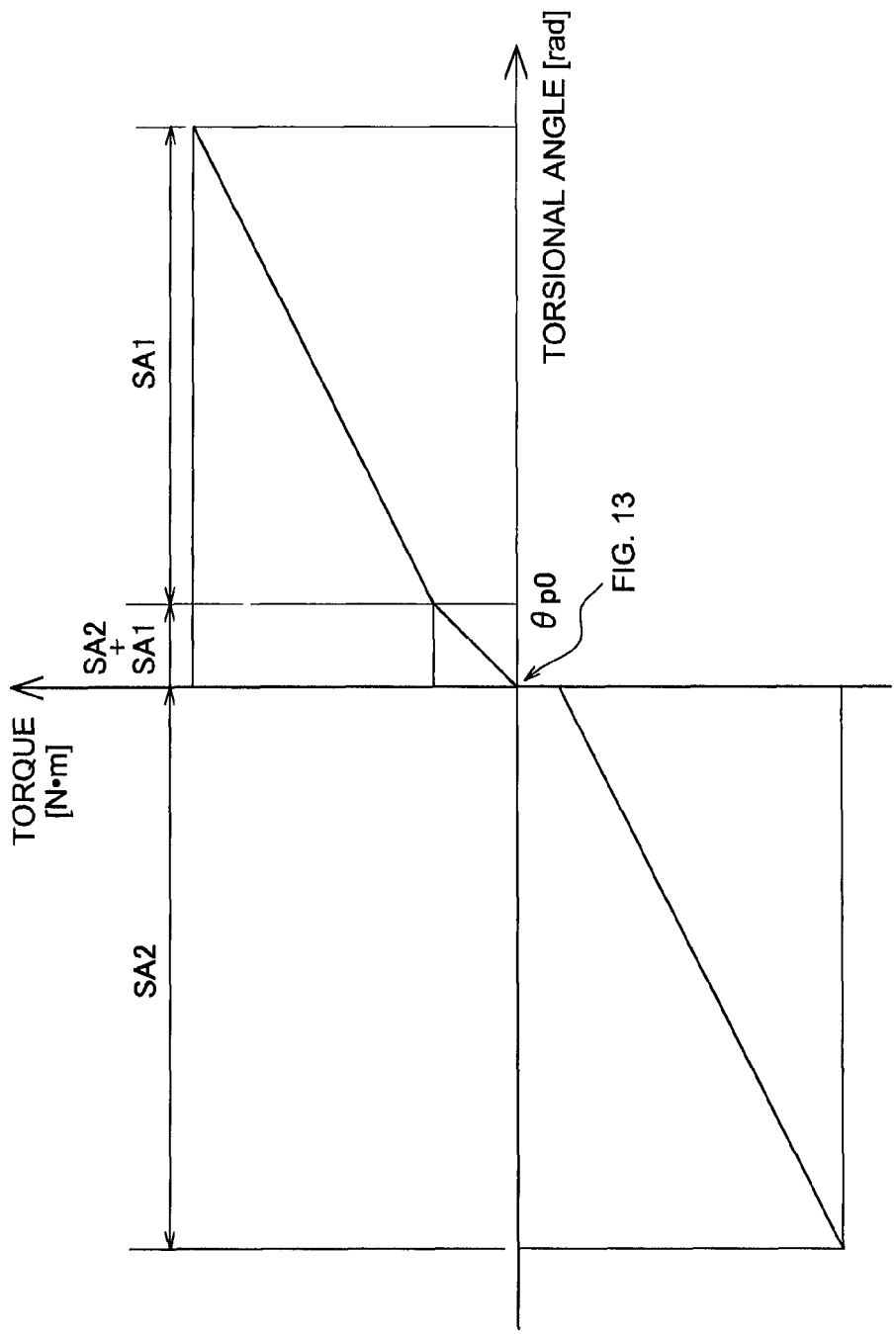
FIG. 14 is a torsional characteristic chart of the damper mechanism (other exemplary embodiment).

(5) In the aforementioned exemplary embodiment, both of the positive-side gap Gp and the negative-side gap Gn are reliably produced. However, it is possible to achieve advantageous effects similar to those achieved by the aforementioned flywheel assembly 1 as long as only either of the positive-side gap Gp and the negative-side gap Gn is reliably produced. For example, as illustrated in FIG. 13, a configuration in a neutral state can be produced that the positive-gap Gp is reliably produced on the R1 side of the stopper part 27, while the negative-side gap Gn is not reliably produced on the R2 side of the stopper part 27. FIG. 14 represents a torsional characteristic chart of the configuration. Alternatively, a configuration in a neutral state can be produced that the positive-side gap Gp is not reliably produced on the R1 side of the stopper part 27, while the negative-side gap Gn is reliably produced on the R2 side of the stopper part 27.

INDUSTRIAL APPLICABILITY

The damper mechanism according to the present invention can enhance durability thereof and simultaneously enhance noise vibration performance thereof. Therefore, the present invention is useful in the field of power transmission devices.

The invention claimed is:

1. A damper mechanism, comprising:
a first rotor including a first support part, a second support part, and a stopper part disposed between the first support part and the second support part in a rotational direction;
a second rotor including a transmission part disposed between the first support part and the second support part in the rotational direction, the second rotor rotatably disposed with respect to the first rotor;
first and second spring seats;
a first elastic member disposed between the first support part and the transmission part in a preliminarily compressed state, the first elastic member being arranged to be in contact with the first spring seat, the first elastic member being arranged to be compressed when the first rotor is relatively rotated with the second rotor in a first direction; and
a second elastic member disposed between the second support part and the transmission part in a preliminarily compressed state, the second elastic member being arranged to be in contact with the second spring seat, the second elastic member being arranged to be compressed when the first rotor is relatively rotated with the second rotor in a second direction being opposite to the first direction, the stopper part being disposed to make contact with the first elastic member and the second elastic member in the rotational direction, the stopper part being fixed to the first rotor and non-rotatable with respect to the first rotor, a first gap being produced between the stopper part and one of the first spring seat and the second spring seat in a neutral state at which no external force is applied to the first rotor and the second rotor.

2. The damper mechanism recited in claim 1, wherein a second gap is produced between the stopper part and the other of the first spring seat and the second spring seat.

3. The damper mechanism recited in claim 2, wherein a dimension of the first gap is roughly equal to a dimension of the second gap in the neutral state.

4. The damper mechanism recited in claim 1, wherein the stopper part is disposed to be axially opposing to the transmission part in the neutral state.

5. The damper mechanism recited in claim 1, wherein a rotation-directional dimension of the transmission part is larger than a rotation-directional dimension of the stopper part.

6. The damper mechanism recited in claim 1, wherein a stiffness of the first elastic member is roughly equal to a stiffness of the second elastic member.

7. The damper mechanism recited in claim 1, wherein the first elastic member is supported by and compressed in the rotational direction between the first support part and the stopper part when only the second elastic member is compressed between the first rotor and the second rotor, and the second elastic member is supported by and compressed in the rotational direction between the second support part and the stopper part when only the first elastic member is compressed between the first rotor and the second rotor.

8. The damper mechanism recited in claim 1, wherein a rotation-directional dimension between the first support part and the stopper part is less than a rotation-directional dimension of the first elastic member in a free state, and a rotation-directional dimension between the second support part and the stopper part is less than a rotation-directional dimension of the second elastic member in a free state.

9. The damper mechanism recited in claim 1, wherein when the stopper part is in the neutral state, the stopper part is opposed to the transmission part in an axial direction.

* * * * *